United States Patent [19]
Honig et al.

[11] Patent Number: 5,343,496
[45] Date of Patent: Aug. 30, 1994

[54] INTERFERENCE SUPPRESSION IN CDMA SYSTEMS

[75] Inventors: Michael L. Honig, Bloomfield; Upamanyu Madhow, Morristown, both of N.J.

[73] Assignee: Bell Communications Research, Inc., Livingston, N.J.

[21] Appl. No.: 127,384

[22] Filed: Sep. 24, 1993

[51] Int. Cl.$^5$ .................. H04L 27/30; H04L 1/00; H04B 1/10
[52] U.S. Cl. .................................. 375/1; 380/34; 370/18; 375/58; 375/94; 375/96; 375/99; 375/101; 375/102; 375/103; 455/50.1; 455/63; 455/283; 455/284; 455/296; 455/303; 455/305; 455/306; 455/307; 455/67.3
[58] Field of Search ............. 375/11, 12, 14, 15, 375/34, 51, 57, 58, 60, 94, 96, 99, 100, 101-103; 455/50.1, 63, 65, 67.1, 226.1, 326.3, 278.1, 283, 284, 295, 296, 299, 303, 305-307; 364/724.01, 724.03, 724.11, 724.12, 724.16-724.19, 724.2, 728.03, 728.06, 728.07, 819, 823-825; 370/18; 455/67.3

[56] References Cited

U.S. PATENT DOCUMENTS

| | | | |
|---|---|---|---|
| 4,217,586 | 8/1980 | McGuffin | 375/1 X |
| 4,470,138 | 9/1984 | Gutleber | 370/18 |
| 4,472,814 | 9/1984 | Gutleber | 375/34 |
| 4,472,815 | 9/1984 | Gutleber | 375/34 |
| 4,608,701 | 8/1986 | Burgers et al. | 375/1 |
| 4,638,493 | 1/1987 | Bishop et al. | 375/1 |
| 4,779,266 | 10/1988 | Chung et al. | 370/93 |
| 5,099,493 | 3/1992 | Zeger et al. | 375/1 |
| 5,260,968 | 11/1993 | Gardner et al. | 375/1 |
| 5,268,927 | 12/1993 | Dimos et al. | 375/1 |

OTHER PUBLICATIONS

Schilling et al., *Spread Spectrum for Commercial Communications*, IEEE Communications Magazine, vol. 29, No. 4, pp. 66–79, Apr. 1991.

R. Lupas et al., *Near-far Resistance of Multiplier Detectors in Asynchronous Channels*, IEEE Transactions on Communications, vol. COM-38, No. 4, pp. 496–508, Apr. 1990.

K. S. Gilhousen, et al., *On the Capacity of a Cellular CDMA System*, IEEE Transactions on Vehicular Technology, vol. 40, No. 2, pp. 303–311, May 1991.

M. L. Honig et al., *Suppression of Near- and Far-end Crosstalk by Linear Pre- and Post-filtering*, IEE Journal on Selected Areas in Communication, vol. 10, No. 3, pp. 614–629, Apr. 1992.

Z. Xie et al., *A Family of Suboptimum Detectors for Coherent Multiuser Communications*, IEEE Journal of Selected Areas of Communication, vol. 8, No. 4, pp. 683–690, May 1990.

*Primary Examiner*—Bernarr E. Gregory
*Attorney, Agent, or Firm*—Leonard Charles Suchyta; James W. Falk

[57] ABSTRACT

Circuitry and concomitant methodology for demodulating Direct-Sequence, Spread-Spectrum Code-Division Multiple-Access (DS/SS CDMA) channel signal using multiple samples per transmitted symbol and a minimum mean squared error criterion to suppress interference. In one embodiment, a bank of cyclically shifted filters determined with reference to the conventional matched filter for CDMA is used to demodulate the channel signal. In another embodiment, a bank of sub-filters determined with reference to the conventional matched filter for CDMA is employed to demodulate the channel signal. In yet another embodiment, the output of a conventional matched filter is oversampled to demodulate the channel signal. Each embodiment utilizes a set of adaptive coefficients selected to minimize the mean square error between the transmitted symbol and detected symbol.

15 Claims, 10 Drawing Sheets

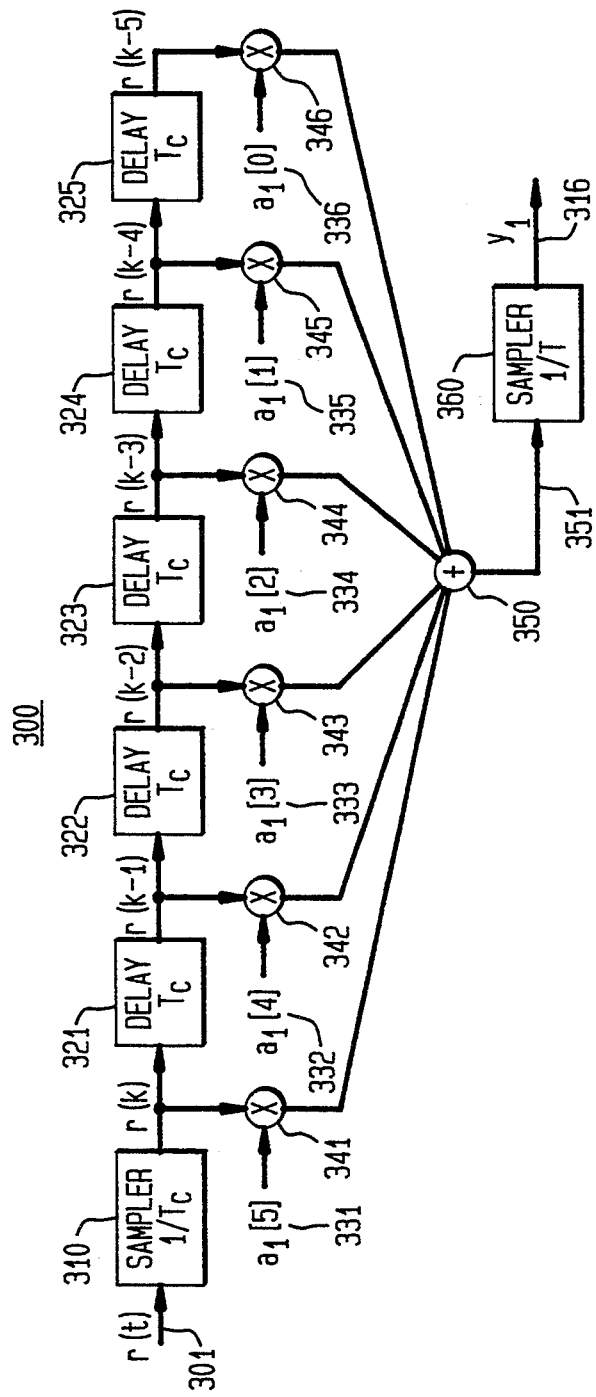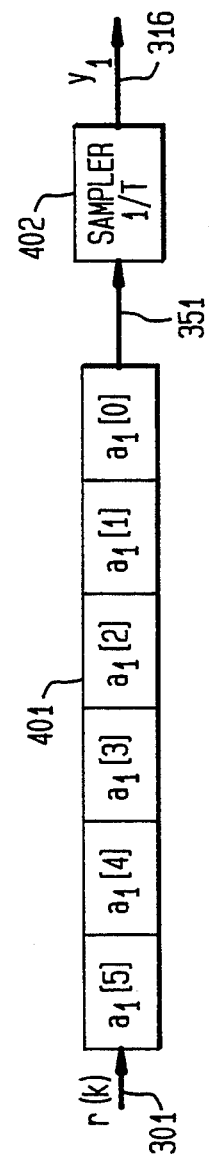
FIG. 3
(PRIOR ART)
300
FIG. 4
400

INTERFERENCE SUPPRESSION IN CDMA SYSTEMS

FIELD OF THE INVENTION

This invention relates generally to digital systems and, more specifically, to circuitry and a concomitant methodology for demodulating direct-sequence spread-spectrum code-division multiple-access signals in the presence of interference.

BACKGROUND OF THE INVENTION

The potential demand for ubiquitous wireless communications combined with restricted availability of the radio frequency spectrum has motivated intense research into bandwidth efficient multiple access schemes. A recent reference entitled "Spread Spectrum for Commercial Communications", by Schilling et al, as published in the IEEE Communications Magazine, Vol. 29, No. 4, April 1991 generally discusses various spread-spectrum techniques to effect multiple access communication and, in particular, one especially attractive avenue of approach, namely, Code-Division Multiple-Access (CDMA) techniques.

CDMA techniques take advantage of available bandwidth on the transmission medium, such as a fiber optic cable or the radio spectrum, by generating a set of pulses in the time domain which have appropriate correlation properties over predetermined time periods. Typically, the correlation property is such that a particular receiver tuned to a given transmitter code produces a detectable signal whenever the given transmitter code is presented to the receiver during each time period, whereas the output of the receiver is near zero for any other transmitter code presented to the receiver. A CDMA system operating on this time domain correlation property and utilizing a set of codes designated the optimal orthogonal codes was disclosed in U.S. Pat. No. 4,779,266; optimal orthogonal codes are but one type of more generic Direct-Sequence Spread-Spectrum (DS/SS) CDMA codes.

Demodulating a DS/SS CDMA signal in the presence of multiple-access interference has been previously addressed in the prior art. As alluded to above, the set of DS/SS waveforms assigned to different users are chosen to have small cross-correlations. This enables reliable communication of several DS/SS signals simultaneously over the same channel provided that all transmissions are received at approximately the same power. When there is a large disparity in received powers, however, the nonzero cross-correlations between the signals gives rise to the "near-far" problem, that is, a high-power transmission interferes significantly with the reception of a low-power transmission when a conventional matched filter receiver (or equivalently, a correlation receiver) is used.

The near-far problem can be mitigated, as taught in the prior art, by interference suppression schemes which use signal processing to exploit the structure of the multiple-access interference instead of treating it as noise. However, these schemes are significantly more complex than the matched filter receiver, and they require knowledge of the interfering signals. Representative of such techniques is the subject matter covered in the reference entitled "Near-far Resistance of Multiplier Detectors in Asynchronous Channels," IEEE Transactions on Communications, Vol. COM-38, No. 4, pp. 496–508, April 1990 as published by R. Lupas and S. Verdu. Hence, recent proposals for demodulation of DS/SS CDMA systems typically assume a matched filter receiver and deal with the near-far problem by controlling the power at the filter inputs, typically using feedback from the receiver. Such an arrangement is covered in the reference entitled "On the Capacity of a Cellular CDMA system," IEEE Transactions on Vehicular Technology, Vol. 40, No. 2, pp. 303–311, May, 1991, as published by K. S. Gilhousen, et al.

Symbol-by-symbol demodulation using the MMSE criterion can generally be implemented adaptively, when the parameters of the multiple-access interference are unknown. This eliminates one of the biggest drawbacks of interference suppression techniques proposed thus far, which typically require knowledge of the interfering signals. MMSE techniques have been used in equalization (as presented in the text Digital Communication, by E. A. Lee and D. G. Messerschmitt, published by Kluwer, 1988) and crosstalk suppression in wire channels (in a paper entitled "Suppression of Near- and Far-end Crosstalk by Linear Pre- and Post-filtering," IEEE Journal on Selected Areas in Communication, Vol. 10, No. 3, April, 1992). Also, it is noted that a related least-squares criterion has been previously proposed (in the article entitled "A Family of Suboptimum Detectors for Coherent Multiuser Communications," IEEE Journal of Selected Areas of Communication, Vol. 8, No. 4, pp. 683–690, May 1990) for sequence detection in the presence of multiple-access interference. The latter scheme is extremely complicated and hence is generally not amenable to continuous adaptation.

The art is devoid of teachings or suggestions of applying the MMSE technique to the demodulation of DS/SS CDMA signals.

SUMMARY OF THE INVENTION

These deficiencies as well as other shortcomings and limitations of the prior art are obviated, in accordance with the present invention, by circuitry and a concomitant method for demodulating the received DS/SS CDMA channel signal using a minimum mean squared error criterion to suppress interference.

Broadly, in accordance with a first aspect of the present invention, an overall communication system is composed generally of a plurality of sources and a plurality of receivers interconnected by a communications channel. The channel propagates DS/SS CDMA signals produced by the sources; each source is assigned a preselected CDMA signature sequence, and similarly each receiver selects or is assigned a predetermined CDMA signature sequence corresponding to the desired transmission. Demodulation of an incoming DS/SS CDMA channel signal is effected in each receiver by sampling the incoming channel signal at a rate corresponding to the processing gain of the CDMA channel signal to produce a sampled incoming signal. The sampled incoming signal is connected to a bank of D filters (wherein D is bounded by the processing gain), each filter being a cyclically shifted version of a standard matched filter used to conventionally detect the incoming DS/SS CDMA signal. The output of each of the D filters is then sampled at the symbol rate of each symbol being conveyed by the DS/SS CDMA signal. Each sampled output of each of the D filters is then weighted by a corresponding adaptive coefficient to obtain a weighted sampled output; the set of coefficients is adaptively selected to minimize the mean squared error between the transmitted and received symbols. All of the weighted sampled outputs are summed to produce an estimate to the transmitted symbol propagated from the corresponding source by the incoming DS/SS CDMA signal.

Broadly, in accordance with a second aspect of the present invention related to the first aspect of the present invention, an overall communication system is composed generally of a plurality of sources and a plurality of receivers interconnected by a communications channel. The channel propagates DS/SS CDMA signals produced by the sources; each source is assigned a preselected CDMA signature sequence, and similarly each receiver selects or is assigned a predetermined CDMA signature sequence corresponding to the desired transmission. To demodulate an incoming DS/SS CDMA channel signal, the signal is sampled at a rate corresponding to the processing gain of the CDMA system to produce a sampled incoming signal. The sampled incoming signal is connected to a bank of D sub-filters (wherein D is bounded by the processing gain) selected with reference to a standard matched filter used to conventionally detect the incoming DS/SS CDMA signal. The output of each of the D sub-filters is then sampled at the rate of D times the original symbol rate of each symbol being conveyed by the DS/SS CDMA signal. Each sampled output of each of the D filters serves as an input to D delay lines. Outputs from predetermined ones of the taps in each of the delay lines are combined to produce a set of D intermediary signals. Each of the D intermediary signals is then sampled at the symbol rate to produce intermediary sampled outputs. Each of the intermediary sampled outputs is then weighted by a corresponding adaptive coefficient to obtain a weighted sampled output; the set of coefficients is adaptively selected to minimize the mean squared error between the transmitted and received symbols. All of the weighted sampled outputs are summed to produce an estimate to the transmitted symbol propagated from the corresponding source.

Broadly, in accordance with a third aspect of the present invention, an overall communication system is composed generally of a plurality of sources and a plurality of receivers interconnected by a communications channel. The channel propagates DS/SS CDMA signals produced by the sources; each source is assigned a preselected CDMA signature sequence, and similarly each receiver selects or is assigned a predetermined CDMA signature sequence corresponding to the desired transmission. To demodulate an incoming DS/SS CDMA channel signal, the signal is sampled at a rate corresponding to the processing gain of the CDMA system to produce a sampled incoming signal. The sampled incoming signal serves as the input to a standard matched filter chosen to conventionally detect the incoming DS/SS CDMA signal. The taps of the standard matched filter are weighted in correspondence to the elements of the signature sequence assigned to the demodulation process, and the weighted outputs are combined to produce a weighted incoming signal. The weighted incoming signal is sampled at D times the symbol rate (wherein D is bounded by the processing gain) to produce a weighted, sampled signal which serves as an input to a tapped delay line; the number of taps in the delay line is selected with reference to the parameter D. Pre-determined outputs from the tapped delay line are further weighted with adaptive coefficients, and the weighted delay line outputs are combined to produce an estimate of the received symbol. The set of coefficients is adaptively selected to minimize the mean squared error between the transmitted and received symbols.

The organization and operation of this invention will be better understood from a consideration of the detailed description of the illustrative embodiments thereof, which follow, when taken in conjunction with the accompanying drawing.

BRIEF DESCRIPTION OF THE DRAWING

FIG. 3 illustrates a conventional matched filter to detect a DS/SS CDMA signal in a given receiver having a pre-determined signature sequence;

FIG. 4 illustrates an equivalent representation for the matched filter shown in FIG. 3;

DETAILED DESCRIPTION

In this description, so as to gain an insight into the underlying principles in accordance with the present invention, a motivating overview of a basic aspect of the present invention is initially presented. This approach has the added advantage of introducing notation which will further aid in understanding the broad aspects of the present invention. After this introduction, a theoretical basis is then presented to provide additional insight into the circuitry and methodology which are presented during discussion of the motivating example.

MOTIVATING OVERVIEW

Figure 1:
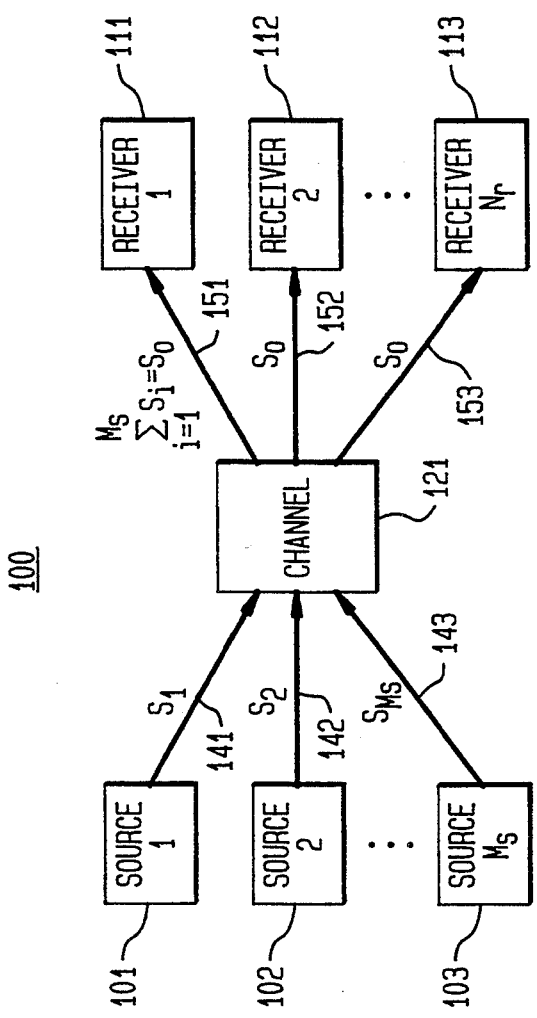
FIG. 1 depicts, in block diagram form, the communication system under consideration in accordance with the present invention.

The general communications system 100 under consideration is depicted in block diagram form in FIG. 1. In system 100, $M_s$ sources 101, 102, . . . , 103 are arranged to communicate with $N_r$ receivers 111, 112, . . . , 113 over interposed channel 121, which is representative of a medium such as a fiber optic link or the radio spectrum. (Although FIG. 1 shows $M_s$ sources and $N_r$ receivers, the demodulation techniques in accordance with the present invention are applicable as well to the special cases where there is only one source or only one receiver ($M_s=1$ or $N_r=1$), that is, the cases wherein a single source transmits to multiple receivers, or multiple sources transmit to a single receiver.)

The channel 121 under consideration for immediate discussion purposes is illustratively of the type that is linear and propagates both positive and negative electrical signals having amplitudes which fall within a given dynamic range. However, signals emanating from sources 101, 102, . . . , 103 on leads 141, 142, . . . , 143, designated by signature signals $S_i$, i=1,2, . . . , $m_s$, respectively, provide a bit stream of rate-increased two-level level signals; without loss of generality, one level is +1 and the other level is −1 on a normalized basis. Each rate-increased stream $S_i$ corresponds to a similar symbol stream produced within each source 101, 102, . . . , 103, respectively, as discussed shortly. Since channel 121 supports multi-level signals, if, for example, two sources both propagate +1 bits during the same time interval, the level of the signal on channel 121 during this time interval is +2.

The composite signal on channel 121 due to all $S_i$'s is the superposition of all $S_i$'s and is represented by $$S_o = \sum_i^{M_s} S_i.$$

Each lead 151, . . . , 153 emanating from channel 121 serves as an input to and provides composite signal $S_o$ to receivers 111, . . . , 113, respectively. It follows from this description that all signatures $S_i$, i=1, . . . , $M_s$, share substantially the same frequency band on channel 121.

For the illustrative example, each signature signal $S_i$ is constrained in time such that sources 101, . . . , 103 initiate a transmission or information interchange in synchronism. One conventional approach of achieving this synchronism is the use of a clock (not shown) to generate timing signals to control synchronization and framing among sources 101, . . . , 103. Receivers 111, . . . , 113 are in synchronism with sources 101, . . . , 103, which "train" receivers 111, . . . , 113 using any of the well-known training techniques to provide the requisite synchronization. (This synchronization constraint can be relaxed in the most general case in which a source-receiver pair having $S_i$ as a signature sequence is synchronized, but all other $S_j$'s source-receiver pairs need not be synchronized with the $S_i$ pair.)

Figure 2:
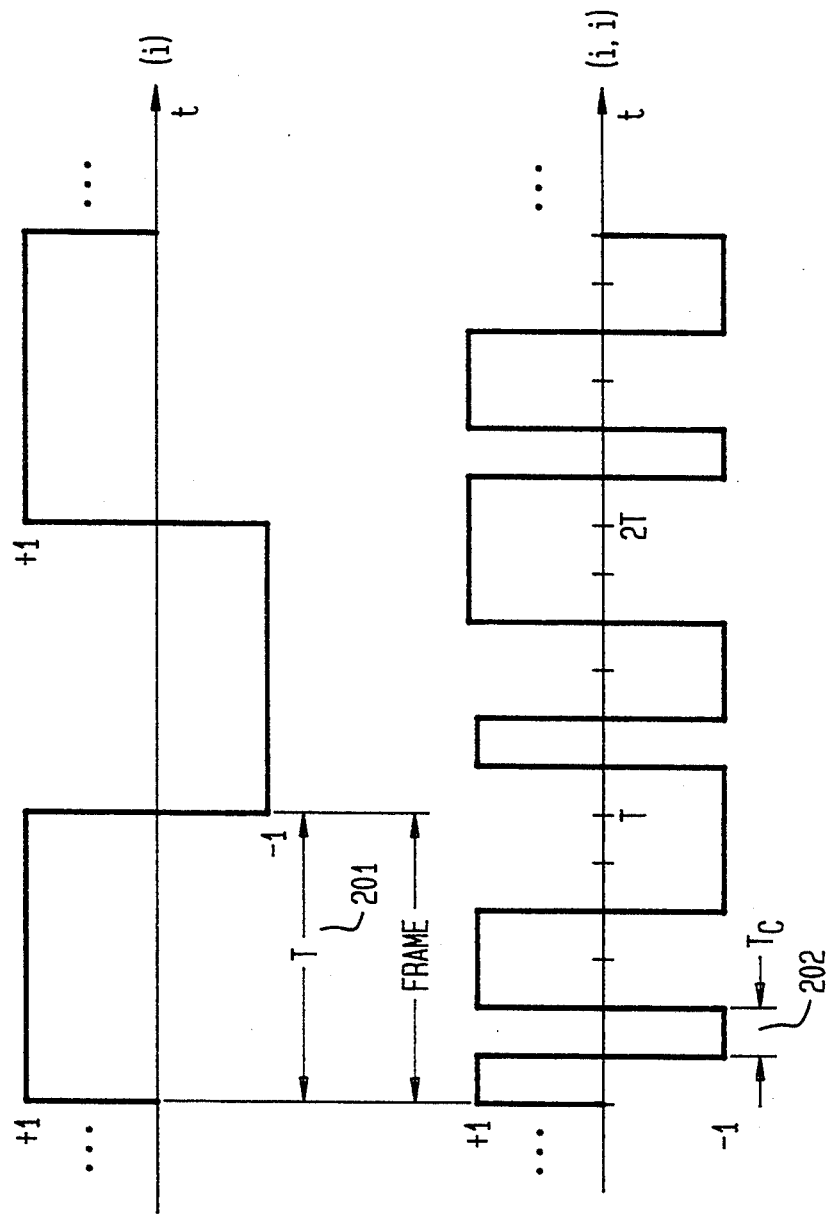
FIG. 2 depicts the relationship between a data symbol stream generated within a source and the rate-increased chip bit stream propagated in correspondence to the data symbol stream.

A primary function of each source 101, . . . , or 103 is that of converting each data symbol generated within the source to a predetermined rate-increased bit stream corresponding to given data symbol, as generally depicted by signal 200 in FIG. 2. Line (i) in FIG. 2 depicts three contiguous data symbols, namely, the +1,−1,+1 symbol stream produced within, say for discussion purposes, source 101 at the symbol rate; the time duration of a symbol is designated as duration 201 in FIG. 2 and is denoted by T.

Line (ii) in FIG. 2 represents a rate-increased output pulse stream, say $S_1$ from source 101, corresponding to the line (i) symbol stream. As shown, a rate-increased signature stream of (+1,−1,+1,+1,−1,−1)-level pulses is propagated for each +1 in the low-rate data symbol stream; however, the negative of this signature stream is propagated for each −1 in the low-rate symbol stream.

In the rate-increased data stream shown in line (ii) of FIG. 2, (also referred to as a "signature" of the associated source $S_1$) a frame corresponds to a symbol having a duration T, and the time interval of each +1 or −1 level in the rate-increased stream is designated the chip duration 202 and is denoted $T_c$. The ratio $T/T_c$ is called the "processing gain" and the ratio is denoted by N ($N=T/T_c$). Therefore, each frame is composed of a fixed number N of so-called "chips"; in FIG. 2, N=6, so six +1 and −1 chips emanate from $S_1$ during each frame. Thus, the signature for source $S_1$ is the ordered set (+1,−1,+1,+1,−1,−1).

In order to communicate effectively within system 100, each signature $S_i$, i=1, . . . , $M_s$, as produced by its assigned source in response to each input symbol, may not be selected arbitrarily, but must be carefully chosen to achieve efficient, error-free communication. This means basically that each $S_i$ must be selected in view of all the other $S_j$'s based on such considerations as number of sources $M_s$ and the bandwidth of channel 121. These considerations, in turn, depend on the system requirements and transmission characteristics. Procedures for selecting sets of signatures $S_i$,i=1, . . . , $M_s$ which effect efficient information interchange for a given number of chips and sources are known in the art. (E.g., see U.S. Pat. No. 4,779,266). An example of another signature, to be used shortly in discussing interference during demodulation, generated with reference to the above-identified signature (namely, (+1,−1,+1,+1,−1,−1)) is the signature given by the ordered set (+1,+1,−1,+1,+1,+1).

The essential function of each receiver 111, . . . , 113 is that of discriminating within the composite signal $S_o$ the preassigned signature associated with each receiver 111, . . . , 113. In one conventional arrangement, each receiver 111, . . . , 113 is implemented by matched filter, as now discussed with reference to FIG. 3.

In FIG. 3, there is shown a standard matched filter 300 for the specific case of six chip positions in a rate-increased data stream. The input, which appears on lead 301, represents a selected one of the receiver leads 151, . . . , or 153, say lead 151 for concreteness. The signal appearing on lead 301, designated r(t), is equal to the signal $S_o$ plus additive noise present on lead 151 at the input to receiver 111. In general, r(t) is a continuous time signal. This continuous signal is converted to a sampled data signal by sampler 310 which samples r(t) at the chip rate $T_c$; for the specific example under consideration, six samples of r(t) are taken in each frame—the samples are denoted by the set r(k), r(k-1), r(k-2), r(k-3), r(k-4), and r(k-5), with r(k) being the latest sample taken and r(k-5) corresponding to the earliest sample in a frame. In order to have access to all six samples for demodulation purposes, the samples are stored in shift register 320 composed of five delay elements 321-325 wherein each delay element provides a delay of $T_c$ seconds between its input and output. To generate the overall filter output $Y_1$, appearing on lead 361: (i) the samples r(k) (k=0, . . . , 5) are each multiplied by a pre-specified coefficient ($a_1$[k], k=0, . . . , 5 shown by reference numerals 341-346, respectively) in multipliers 341-346, respectively, to obtain resultant products; (ii) the resultant products are summed in summer 350, with the resultant sum appearing on lead 351; and (iii) the resultant sum is sampled by sampler 360 at the frame rate 1/T to produce the output $y_1$. (Typically, $y_1$ is processed by a threshold detector (not shown) to yield a bit decision corresponding to the estimate of the received symbol; in the remainder of the discussion, such a conventional threshold detector is presumed to exist, although it is not shown for sake of clarity.) In the implementation of filter 300, sample r(k) is multiplied by coefficient $a_1[5]$, r(k−1) by $a_1[4]$, . . . , and r(k-5) by $a_1[0]$. In general, the $a_1[i]$'s correspond to the signature sequence assigned to the given receiver. If it is assumed that matched filter receiver 300 is configured to demodulate the first above-identified signature sequence (+1,−1,+1,+1,−1,−1,), then the $a_1[i]$'s are assigned in reverse order to the signature sequence, that is, $a_1[0]=-1$, $a_1[2]=-1$, $a_1[2]=+1$, . . . , $a_1[5]=+1$. Thus, whenever a data symbol is transmitted by a source assigned the same signature, $Y_1$ achieves peak correlation, which in this case is the value +6 or the peak correlation value equals the number of chips. This occurs since $r(k)=a_1[k]$, k=1, . . . , 5 if there are no interferers (that is, no other signatures) present and the noise is negligible, and $r(5)a_1[5]+r(4)a_1[4]+$, . . . $r(0)a_1[0]=+6$. For comparison, on the other hand, if r(k) corresponds to the second signature given above, then $Y_1$ equals −2 since $r(5)a_1[5]=-1$, $r(4)a_1[4]=-1$, . . . , and $r(0)a_1[0]=+1$.

To reduce the complexity of the description in the remainder of the discussion, matched filter 300 of FIG. 3 is shown in short-hand representation by filter 400 in FIG. 4 since filter 400 sets forth the essence of matched filter 300. Filter arrangement 401 equates to the circuitry encompassed by elements having reference numerals 310-346 in FIG. 3, and sampler 402 equates to sampler 360.

Figure 5:
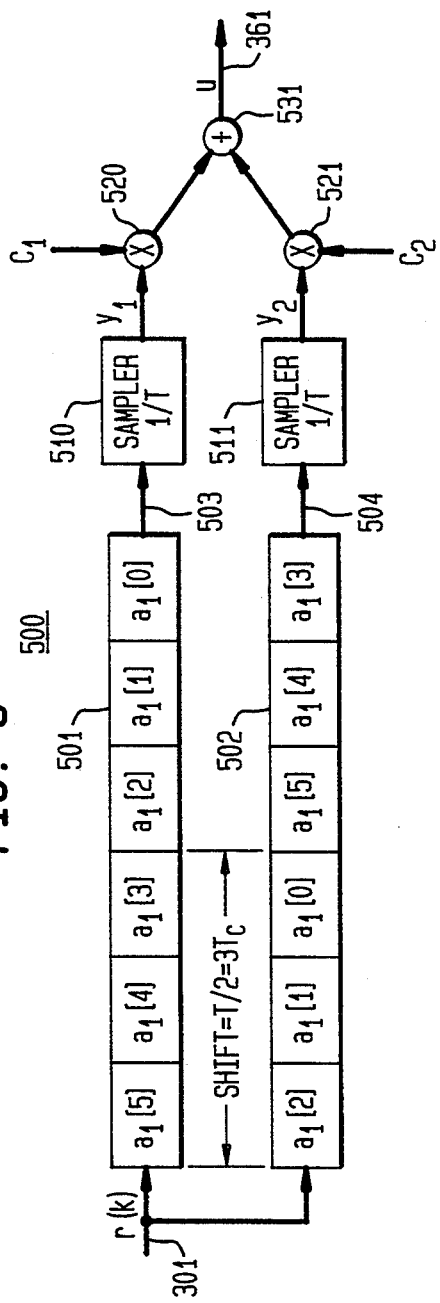
FIG. 5 illustrates one illustrative embodiment of a cyclically shifted filter bank for the case of $D=2$.

In accordance with one aspect of the present invention, called the cyclically shifted filter bank (CSFB) arrangement, an exemplary filter arrangement 500 utilized in each receiver 111-113 is depicted in FIG. 5 for the same signature sequence $a_1[k]$, k=0,1, . . . , 5, discussed with reference to the arrangements of FIGS. 3 and 4. Filter 501 is actually the matched filter 401, as represented by FIG. 4. However, filter 500 is composed of a second filter 502, operating in parallel with filter 501, which is a shifted version of matched filter 501. (In a later section, as will be discussed, filter 500 is the result of selecting the value of two (2) for a parameter designated D in that section; D corresponds to the number of samples to be taken per source symbol in each frame and, in effect, determines the number of matched filters, such as filters 501 and 502, to be placed in parallel.) To derive filter 502 from filter 501, filter 501 is shifted three positions to the right so that $a_1[2]$ occupies the position corresponding to $a_1[5]$ of filter 501, $a_1[1]$ occupies the same position as $a_1[4]$, and so forth; as depicted, the shift equates to $3T_c$ chip positions or, equivalently, T/2 (T/D) chip positions. The output of filter 501, appearing on lead 503, serves as an input to sampler 510, which samples at the original symbol rate T. Similarly, the output of filter 502, appearing on lead 504, serves as an input to sampler 511, which samples at the original symbol rate T. The output of sampler 510, designated $Y_1$, serves as one input to multiplier 520. The other input to multiplier 520 is an adaptively-selected coefficient, designated $c_1$; its selection and function are discussed below. Similarly, the output of sampler 511, designated $y_2$, serves as one input to multiplier 521. The other input to multiplier 521 is an adaptively-selected coefficient, designated $c_2$; its selection and function are discussed below. Finally, the outputs of both multipliers 521 and 522 serve as inputs to summer 531, with the output (u) of summer 531 representing the symbol detected by the given receiver.

The set of coefficients ($c_1$, $c_2$) is selected so as to minimize the mean square error between the transmitted and detected symbol. These coefficients may typically be determined adaptively by executing a training session on arrangement 500 prior to the transmission of any actual data symbols.

To illustrate the effectiveness of the MMSE technique, a numerical example is most illuminating. It is assumed that two sources may be transmitting symbols (say source 101 and 102 in FIG. 1), with source 101 having a signature sequence given above by the $a_1[i]$'s, namely, as represented by the set (1,−1,1,1,−1,−1, ), and with source 102 having the signature sequence given above by the $a_2[j]$'s, namely, as represented by the set (1,1,−1,1,1,1). The focus is on the demodulation scheme at one receiver (say receiver 111) which has a signature sequence corresponding to source 101, namely, the signature set (1,−1,1,1,−1,−1). Accordingly, source 102 may be considered an interferer with respect to source 101-receiver 111 pair. The received channel signal for a given frame, after sampling, is r[k], k=0,1, . . . , 5. For k=0, $$r(0) = b_1 a_1[0] + \sqrt{P}\, b_2 a_2[0] + n(0),$$

where $b_1$ is the symbol (+1 or −1) produced by source 101, $b_2$ is the symbol produced by source 102, $P_2$ is the relative power of source 102 compared to source 101, and n(0) is Gaussian noise having a zero mean and a variance of $\sigma^2$. Thus, generally, for k=0,1, . . . , 5, $$r(k) = b_1 a_1[k] + \sqrt{P}\, b_2 a_2[k] + n(k).$$

Assume for the moment that source 102 is not transmitting and that the conventional matched filter 300 is implemented in receiver 111; then the signal-to-noise ratio of source 101 as measured at the output of receiver 111, designated $SNR_1$, is $SNR_1 = N/\sigma^2$. For the sake of comparison of actual numerical values, suppose $\sigma^2$ is such that $SNR_1 = 15$ dB. Now, if source 102 is transmitting simultaneously with source 101, if the noise power is assumed to be the same as when source 102 was not transmitting, and if source 102 has a relative power $P_2$, then a new measure, called the signal-to-interference ratio ($SIR_1$), is indicative of the strength of source 101 relative to both the additive noise and the interference from source 102; $SIR_1$ is commensurate with $SNR_1$, and the two measures coalesce when source 102 is not active. Again, for the sake of comparison purposes, suppose the relative power of source 102 is 5 dB greater than source 101, that is, $10\log_{10}P_2 = 5$. Then, $SIR_1 = 4.2$ dB for receiver 111 implemented with the conventional matched filter 300.

Suppose now that receiver 111 is implemented with filter arrangement 500, that both source 101 and 102 are transmitting simultaneously, that the noise power the same as in previous computations, and that the relative power $P_2$ remains as 5 dB, and that coefficients $c_1 = 0.73$ and $c_2 = 0.69$ (which were determined by minimizing the MMSE between transmitted and detected symbol), then $SIR_1 = 13.3$ dB.

To recap, for the conventional matched filter 300, $SNR_1=15$ dB (a measure of the best signal strength to be expected with source 102 inactive and additive noise present), but $SIR_1=4.2$ dB. However, for filter 500, $SIR_1=13.3$ dB, a significant improvement over the conventional matched filter and close to the best that can be achieved with the conventional arrangement presuming an inactive source 102.

Figure 6:
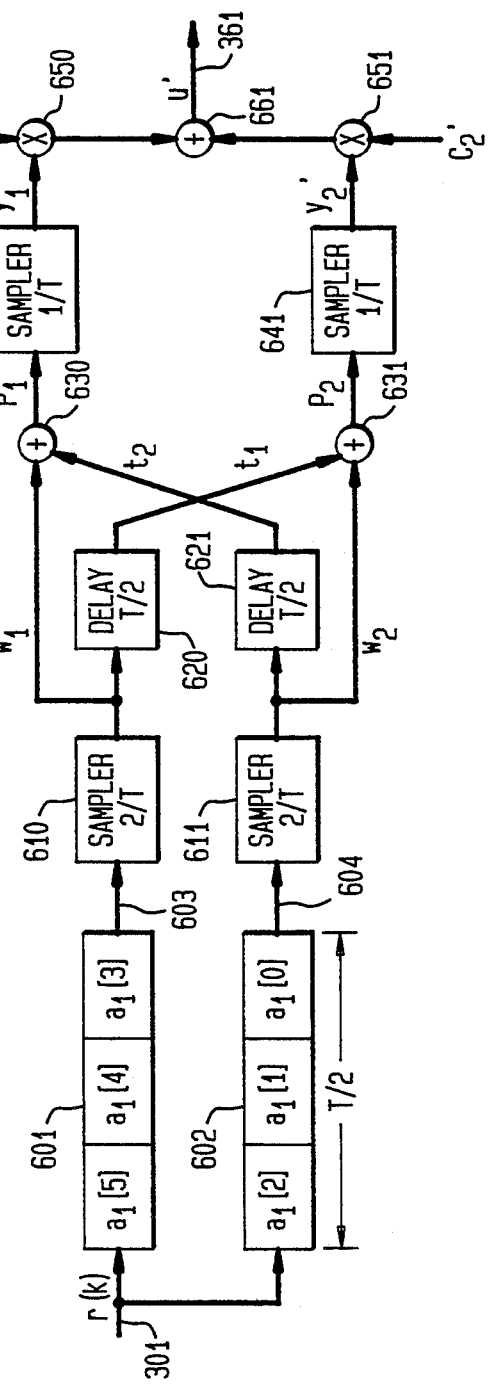
FIG. 6 illustrates one illustrative embodiment of a bank of sub-filters for the case of $D=2$ corresponding to the short filter bank realization of the filter in FIG. 5.

In accordance with another aspect of the present invention, called the short filter bank realization of the CSFB technique, an exemplary filter arrangement 600 utilized in each receiver 111–113 is depicted in FIG. 6 for the same signature sequence $a_1[k]$, $k=0,1,\ldots,5$, discussed with reference to the arrangements of FIGS. 3 and 4. Filter 601 is a sub-filter related to matched filter 401 represented by FIG. 4 and is obtained by selecting the first three elements in the front end of filter 401, namely, $a_1[5]$, $a_1[4]$, and $a_1[3]$. Filter 600 is also composed of a second filter 602, operating in parallel with filter 601, which is obtained from the remaining three elements of filter 401, namely, $a_1[2]$, $a_1[1]$, and $a_1[0]$. (In a later section, as will be discussed, filter 600 is the result of selecting the value of two (2) for a parameter designated D in that section; in effect, D determines the manner of splitting matched filter 300 into sub-filters such as filters 601 and 602.) The output of filter 601, appearing on lead 603, serves as an input to sampler 610, which samples at two (D=2) times the original symbol rate 1/T. Similarly, the output of filter 602, appearing on lead 604, serves as an input to sampler 611, which also samples at twice the original symbol rate 1/T. The output of sampler 610, designated $w_1$, serves as one input to summer 630 as well as the input to delay element 620; the delay of element 620 is T/2 (T/D generally) and its output is designated $t_1$. The output of sampler 611, designated $w_2$, serves as one input to summer 631 as well as the input to delay element 621; the delay of element 621 is T/2 (T/D generally) and its output is designated $t_2$. The other input to summer 630 is $t_2$, whereas the other input to summer 631 is $t_1$. The output of summer 630, designated $p_1$ and referred to as a first intermediary signal, serves as the input to sampler 640, which samples at the rate 1/T; the output of sampler 640 becomes the first intermediary sampled output and is designated by $y'_1$. In addition, the output of summer 631, designated $P_2$ and referred to as a second intermediary signal, serves as the input to sampler 641, which samples at the rate 1/T; the output of sampler 641 becomes the second intermediary sampled output and is designated by $y'_2$. The output $y'_1$ serves as one input to multiplier 650; the other input to multiplier 650 is an adaptively-selected coefficient, designated $c'_1$; its selection and function are discussed below. Similarly, the output $y'_2$ serves as one input to multiplier 651; the other input to multiplier 651 is an adaptively-selected coefficient, designated $c'_2$; its selection and function are discussed below. Finally, the outputs of both multipliers 650 and 651 serve as inputs to summer 661, with the output $u'$ of summer 661 representing the symbol detected by the given receiver.

The set of coefficients $(c'_1, c'_2)$ is commensurate with the coefficients selected for the cyclically-shifted filter arrangement 500, that is, the coefficients $c'_1$ and $c'_2$ of filter 600 are selected so as to minimize the means square error between the transmitted and detected symbol. These coefficients may typically be determined adaptively by executing a training session on arrangement 600 prior to the transmission of any actual data symbols.

Figure 7:
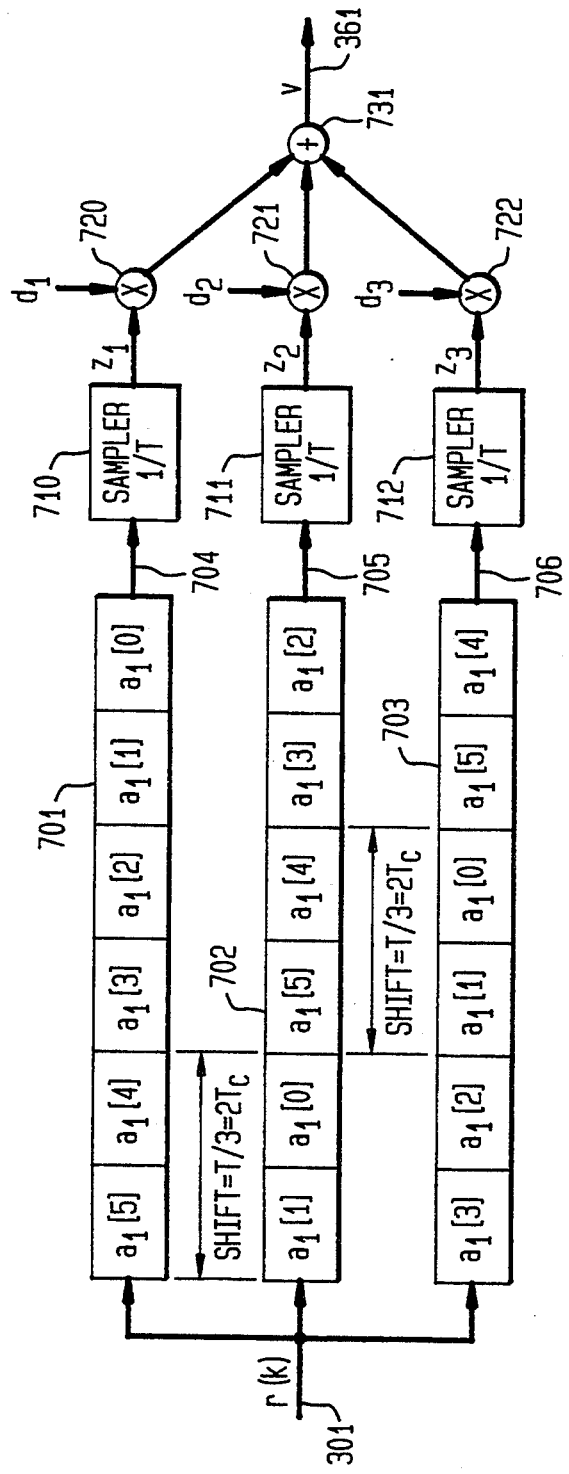
FIG. 7 illustrates one illustrative embodiment of a cyclically shifted filter bank for the case of $D=3$.
Figure 8:
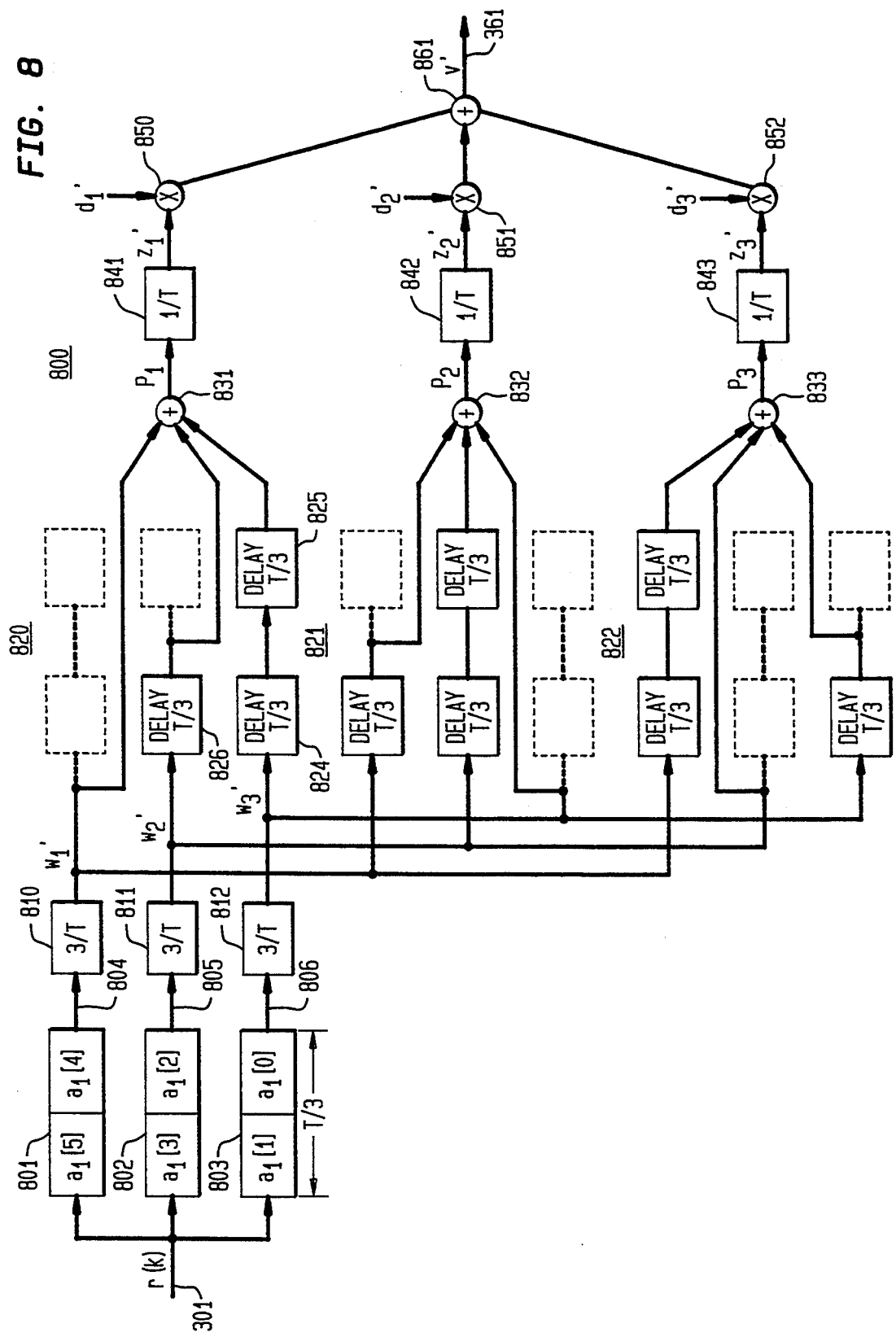
FIG. 8 illustrates one illustrative embodiment of a bank of sub-filters for the case of $D=3$ corresponding to the short filter bank realization of the filter in FIG. 7.

To provide additional illustrative examples of both a cyclically-shifted and the short filter bank version of the CSFB filter for the special case of D=3, reference is made to FIGS. 7 and 8, respectively. FIG. 7 illustrates filter 700 composed of original matched filter 701 and two cyclically-shifted versions 702 and 703 of matched filter 701. The operation and structure of filter 700 is, by analogy, commensurate with FIG. 5. In particular, filter 702 is obtained from filter 701 by a right shift of two positions (N/D), whereas filter 703 is obtained from filter 701 by a right shift of four positions (or two positions of filter 702). Each filter 701–703 is sampled by a corresponding sampler 710–712 to produce outputs $z_1$, $z_2$, and $z_3$, respectively. Adaptive coefficients $d_1$, $d_2$, and $d_3$ weight the respective $z_i$'s to obtain weighted sampled outputs, and the weighted sampled outputs are summed in summer 731 to produce an estimate v of the received symbol.

FIG. 8 illustrates filter 800 composed of three sub-filters 801, 802, and 803 derived from matched filter 401 by partitioning matched filter 401 into three segments and then arranging each of the sub-filters to process the sampled input signal represented by the r(k) samples. The operation and structure of filter 800 is, by analogy, commensurate with FIG. 6. In particular, the matched filter 401 is partitioned into 3 segments (N/D) to provide three sub-filters 801–803, and each of the sub-filters is sampled in sampler 810–812 to produce sampled outputs $w'_1$, $w'_2$, and $w'_3$, respectively. Each of the sampled outputs serves as an input to D tapped delay lines. Each of the lines has, generally, the same number of delays as the number of positions in the sub-filter, that is, N/D delays. For instance, $w'_1$–$w'_3$ serve as inputs to tapped delay line arrangement 820. In arrangement 820, $w'_3$ is delayed by delay taps 824 and 825, each providing a delay of T/3, and the output of element 825 serves as one input to summer 831. In addition, $w'_2$ undergoes a delay of T/3 as furnished by delay element 826, and the output of element 826 serves as a second input to summer 831. Finally, $w'_1$ is not delayed, and serves as the remaining input to summer 831. The output of summer 831, an intermediary signal designated $p_1$, is sampled at the symbol rate 1/T in sampler 841 to produce intermediary sampled output $z'_1$. Similarly, the $w'_i$ outputs serve as inputs to delay line arrangements 821 and 822; pre-determined ones of the taps composing each arrangement provide inputs to summers 832 and 833, as shown. Summer 832 emits intermediary signal $P_2$, whereas summer 833 emits intermediary signal $P_3$. Each of the intermediary signals is sampled by samplers 841–843 to yield sampled signals $z'_1$–$z'_3$, respectively. The output of each of samplers 841–843 is weighted by adaptive coefficient $d'_1$–$d'_3$, respectively. All weighted sampled outputs are combined in summer 861 to produce the estimate $v'$ to the transmitted symbol. (Delay lines not actually implemented in a particular delay line arrangement are shown as dashed to provide a visual indication of the symmetry among all the delay line arrangements).

Figure 9:
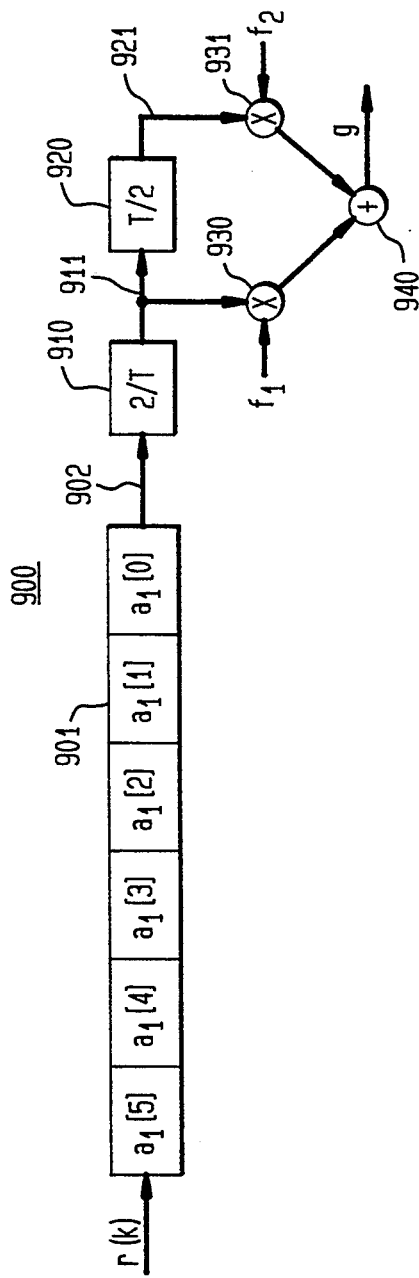
FIG. 9 illustrates one illustrative embodiment of a filter arrangement corresponding to the oversampling technique for the case of $D=2$.

In accordance with another aspect of the present invention, filter arrangements corresponding to the oversampling technique for the special cases of D=2 and D=3 are discussed with reference to FIGS. 9 and 10, respectively. With reference to FIG. 9, oversampling arrangement 900 includes conventional matched filter 901 commensurate with filter 401 of FIG. 4. In this case, however, the weighted output of filter 901, on lead 902, is sampled at twice the symbol rate by sampler 910, and the output of sampler 910 is produced on lead 911. This output serves as an input to multiplier 930; the other input to multiplier 930 is adaptive coefficient $f_1$. A delayed version of the output of sampler 930, as provided by delay element 920 having a delay $T/2$, serves as an input to another multiplier 931; the second input to multiplier 931 is adaptive coefficient $f_2$. The outputs of multipliers 930 and 931 serve as an input to summer 940, and the resulting summation produces the estimate (g) to the received symbol. The coefficients $f_1$ and $f_2$ are selected to minimize the mean square between the transmitted and received symbol.

Figure 10:
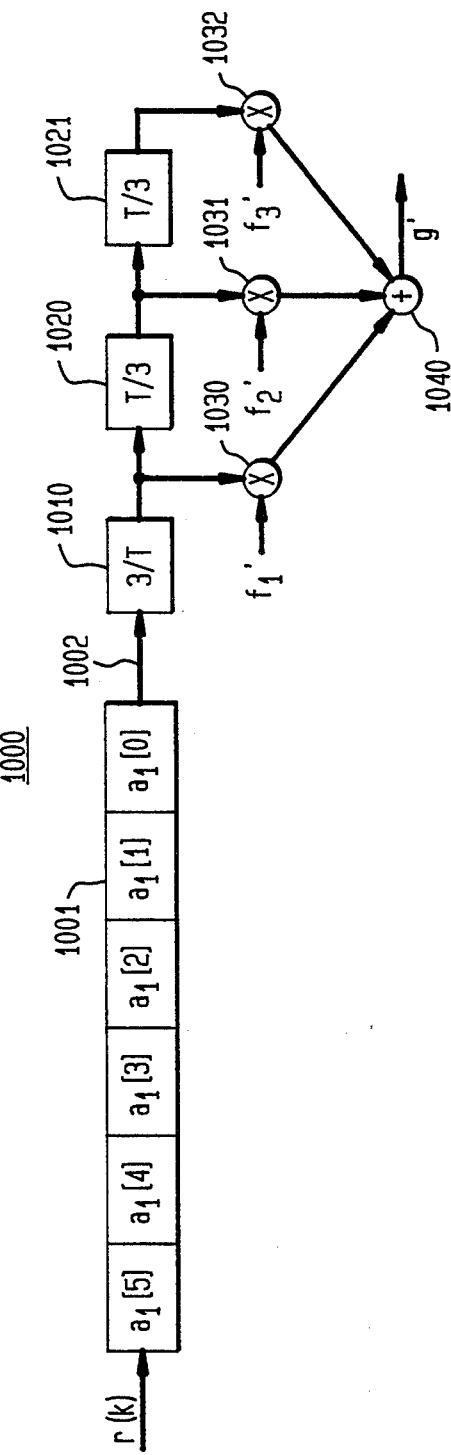
FIG. 10 illustrates one illustrative embodiment of a filter arrangement corresponding to the oversampling technique for the case of $D=3$.

With reference to FIG. 10, there is shown filter structure 1000 illustrative of the oversampling technique for D=3. The operation and structure of filter 1000 is, by analogy, commensurate with filter 900 FIG. 9. In particular, the output of matched filter 1001, on lead 1002, is sampled at three times the symbol rate by sampler 1010. Moreover, the output of sampler 1010, as well as first and second delayed versions of the sampler output, as provided by delay elements 1020 and 1021 each having a delay of $T/3$, are weighted by adaptive coefficients $f'_1$-$f'_3$ to produce the received symbol $g'$.

To complete the numerical example started above on the effectiveness of the techniques in accordance with the present invention, the $SIR_1$ for the oversampling scheme illustrated by FIG. 9 is now presented. It is assumed that two sources may be transmitting symbols (say source 10! and 102 in FIG. 1), with source 101 having a signature sequence given above by the $a_a[i]$'s, namely, as represented by the set $(1,-1,1,1,-1,-1,)$, and with source 102 having the signature sequence given above by the $a_2[j]$'s, namely, as represented by the set $(1,1,-1,1,1,1)$. The focus is on the demodulation scheme at one receiver (say receiver 111) which has a signature sequence corresponding to source 101, namely, the signature set $(1,-1,1,1,-1,-1)$. Accordingly, source 102 may be considered an interferer with respect to source 101-receiver 111 pair.

Suppose now that receiver 111 is implemented with filter arrangement 900, that both source 101 and 102 are transmitting simultaneously, that the noise power is the same as in previous computations, and that the relative power $P_2$ remains as 5 dB, and that coefficients $f_1=0.72$ and $f_2=0.64$ (which were determined by minimizing the MMSE between transmitted and detected symbol), then $SIR_1=7.0$ dB. For oversampling filter 1000, with $f'_1=-0.03$, $f'_2=1.30$, and $f'_3=1.16$, then $SIR_1=10.7$ dB.

To recap, for the conventional matched filter 300, $SNR_1=15$ dB, but $SIR_1=4.2$ dB. For filter 500, $SIR_1=13.3$ dB; for filter 900, $SIR_1=7.0$ dB; and for filter 1000, $SIR_1=10.7$ dB.

SYSTEM MODEL

Since both continuous- and discrete-time signals are considered, the value at time t of a continuous-time signal x will be denoted as x(t), and the value at time k of a discrete-time signal x will be denoted as x[k]. The received signal is the sum of K simultaneous transmissions corrupted by additive white Gaussian noise. The received signal due to the jth user is given by $$r_j(t) = \sqrt{2P_j} \sum_{i=-\infty}^{\infty} b_j[i] \, s_j(t - iT - \nu_j) \cos(\omega_c t + \theta_j), \quad (1)$$

$$1 \leq j \leq K,$$

where T is the bit or symbol interval, $b_j[i]$ is the ith bit of the jth user (taking the value $+1$ or $-1$), $P_j$ is the power, $\nu_j$ is the delay, $\theta_j$ is the carrier phase, and $s_j(t)$ is a normalized baseband waveform that satisfies $$\int_0^T s_j^2(t) \, dt = 1,$$

and $s_j(t)=0$, for t not in $[0,T]$. In this exposition, the signal $s_j(t)$ is a DS/SS waveform given by $$s_j(t) = N^{-\frac{1}{2}} \sum_{l=0}^{N-1} a_j[l] \, \psi(t - lT_c), \quad (2)$$

where $a_j[l] \in \{-1,1\}$, and the N-vector $a_j=(a_j[0], a_j[1], \ldots, a_j[N-1])^T$ denotes the signature sequence for the jth user. The waveform $s_j(t)$ contains N chips; the duration $T_c=T/N$ is called the chip duration, N is called the processing gain, and $\Psi(t)$ is the chip waveform, which has unit energy and duration $T_c$.

$$r(t) = \sum_{j=1}^{K} r_j(t) + n(t), \quad (3)$$

where n(t) is white Gaussian noise with double-sided power spectral density $N_O/2$. The problem of demodulating the first transmission is treated initially, which will be referred to as the "desired transmission". It is assumed that the receiver is synchronized to this transmission, so that the kth sample at the output of the chip matched filter is $$r[k] = (2N)^{\frac{1}{2}} \int_{kT_c + \nu_1}^{(k+1)T_c + \nu_1} r(t) \, \psi(t) \cos(\omega_c t + \theta_1) \, dt. \quad (4)$$

The receiver uses the discrete-time signal for its bit decisions.

Without loss of generality it is assumed that $\nu_1=0$ and $\theta_1=0$. For convenience, a carrier- and chip-synchronous system in which the relative carrier phases $\theta_j=0$, and the relative delays $\nu_j=\tau_j T_c$ for $2 \leq j \leq K$, where $\tau_j$ is an integer between 0 and $N-1$ is considered. The analysis can be easily generalized to remove these assumptions. The bits $b_j[i]$ are assumed to be independent and identically distributed random variables taking on values $\pm 1$ with equal probability.

It is also assumed that to demodulate each bit, the receiver observes the received signal for only one symbol interval. That is, to demodulate $b_1[0]$, the receiver observes the received signal only for $t \in [0, T]$, or equivalently, uses only the vector of received samples $r=(r[0], \ldots, r[N-1])^T$. From (1)-(4), $$r = b_1[0] \, a_1 + \sum_{j=2}^{K} \sqrt{P_j} \, (b_j[0] \, a_j^{(0)} + b_j[-1] \, a_j^{(-1)}) + n. \quad (5)$$

The N-dimensional noise vector n is Gaussian with mean zero and covariance matrix $\sigma^2 I_N$, where $I_N$ denotes the $N \times N$ identity matrix, and $\sigma^2=N(N_O/2)$. In general, if the relative delay $\tau_j$ is nonzero, then the jth user gives rise to two interference vectors, given by $$a_j^{(0)}[l]=a_j[l-\tau_j]u[l-\tau_j],\ 0\le l\le N-1,$$

$$a_j^{(-1)}[l]=a_j[l+N-\tau_j](1-u[l-\tau_j]),\ 0\le l\le N-1,$$

where $2<j<N-1$, and where $u[l]$ is the indicator function for nonnegative integers.

The detector that chooses $\hat{b}_1[0]=\text{sgn}(c^T r)$, where c minimizes $\text{MSE}=E\{(c^T r-b_1[0])^2\}$ is called the "N-tap MMSE detector" and is cited here for discussion purposes so as to show the point of departure of the present invention; how this detector is distinguished from the inventive subject matter, which also uses a MMSE criterion, is presented shortly.

As the power of the interferers becomes large, or as the background noise variance vanishes, the N-tap MMSE solution approaches a zero-forcing solution. In analogy with single user channels with intersymbol interference, the zero-forcing solution completely eliminates multi-user interference while enhancing the noise. In contrast, the N-tap MMSE solution balances the effect of noise and multi-user interference and yields a higher Signal-to-Interference Ratio (SIR) than the zero-forcing solution. The performance criterion used is asymptotic efficiency, which is based on the bit error probability. Since the asymptotic efficiency is computed under the limiting situation in which the noise variance tends to zero, the N-tap MMSE solution has the same asymptotic efficiency as the zero-forcing solution, and is therefore near-far resistant.

The N-tap MMSE detector requires the adaptation of N taps, where the processing gain N may be large. Because of the complexity and coefficient noise associated with such a filter, simpler interference suppression schemes in accordance with the present invention are now elucidated.

INTERFERENCE SUPPRESSION ARRANGEMENTS

A. Cyclically Shifted Filter Bank (CSFB)

Both the MMSE linear detector and the zero-forcing detector for the chip- and symbol-synchronous version of the continuous-time channel ($v_j=0$, $1\le j\le K$) contain a bank of K filters matched to each of the signal vectors appearing in equation (5) (in this case $a_j^{(-1)}=0$), where the outputs of the matched filters are linearly combined. If, however, the interfering signal vectors are unknown, the filters matched to the interference vectors by $K-1$ fixed filters that are chosen to be approximately orthogonal to the matched filter for the desired signal and to each other can be replaced. A zero-forcing solution still exists provided that the space spanned by the bank of receiver filters (vectors in $R^N$) contains the space spanned by the transmitted signal vectors. That is, the samples at the output of the new bank of filters can still be linearly combined so as to eliminate the multi-user interference at the expense of enhancing the noise. In principle, a bank of K filters can therefore suppress $K-1$ interferers in a wide variety of cases. Since the MMSE solution tends to the zero-forcing solution as the noise variance tends to zero, this implies that this type of structure, where the outputs of the K filters are linearly combined according to the MMSE criterion, is often near-far resistant.

To simplify the linear MMSE detector, the bank of matched filters is replaced by a bank of D filters which are cyclic shifts of the matched filter. That is, for $0<i\le D-1$, the ith filter is specified by the vector $f_i\epsilon R^N$, where $f_0=a_1$ (matched to the desired signal), and the lth component of $f_i$ is $$f_i[l]=a_1[(l+i\Delta)\bmod N],\ 0\le l\le N-1. \tag{6}$$

Successive shifts are therefore spaced by $\Delta=[N/D]$. The outputs of the filters after the zeroth symbol interval form a vector $t=(t_0,\ldots,t_{D-1})^T \epsilon R^D$, where $t_i=f_i^T r$, $0\le i\le D-1$, is the output of the ith filter after the zeroth symbol interval, and r is the vector of received samples given by equation (5). The decision rule is then $\hat{b}_1[0]=\text{sgn}(c^T t)$, where $c\epsilon R^D$ is chosen to minimize $\text{MSE}=E\{(c^T t-b_1[0])^2\}$. Generally, D is at least twice the number of strong asynchronous interferers.

There are two reasons for choosing the bank of filters as in equation (6). First, when N is large, the auto-correlations of spreading sequences assigned to each user are designed to be small for nonzero shifts. The filters defined by (6) are therefore approximately orthogonal to each other, and span a D-dimensional subspace, which is necessary for the suppression of $D-1$ interferers. Second, that in this case the vector t can be generated with D filters each of length N/D. The total number of coefficients in the filter bank is therefore N, instead of ND.

To demonstrate this, for simplicity, it is assumed that D divides N. For the choice of filters specified by equation (6), the output of the ith filter after the zeroth symbol interval is $$t_i=\sum_{l=0}^{N-1}a_1[(l+i\Delta)\bmod N]r[l]= \tag{7}$$

$$\sum_{k=0}^{D-1}\sum_{l=0}^{\Delta-1}a_1[l+k\Delta]\,r[(l+(k-i)\Delta)\bmod N].$$

Now divide each filter $f_i$ into D disjoint contiguous sub-filters of length N/D. Notice that the set of sub-filters for each cyclically shifted filter, which is denoted as $\{e_k\}$, $k=1,\ldots,N/D$, is the same. That is, $$e_k[l]=a_1[l+k\Delta],\ 0\le l\le\Delta-1,\ 0\le k\le D-1. \tag{8}$$

Let $y_j[m]$ be the output of the jth filter at time m. Then equations (7) and (8) imply that $$t_i=\sum_{k=0}^{D-1}y_k[((k-i+1)\Delta-1)\bmod N],\ 0\le i\le D-1,$$

that is, $t_i$ is the sum of the outputs of the sub-filters $e_k$, $k=1,\ldots,D$, sampled at (chip) time $[(k-i+1)\Delta-1]$ mod N. To generate all D components of t the outputs of $\{e_k\}$ must be sampled D times at chip times $iN/D$, $i=0,\ldots,D-1$. Of course, to detect $b_1[m]$ all indices representing chip samples used to generate the corresponding vector of filter outputs are incremented by mN.

Figure 11:
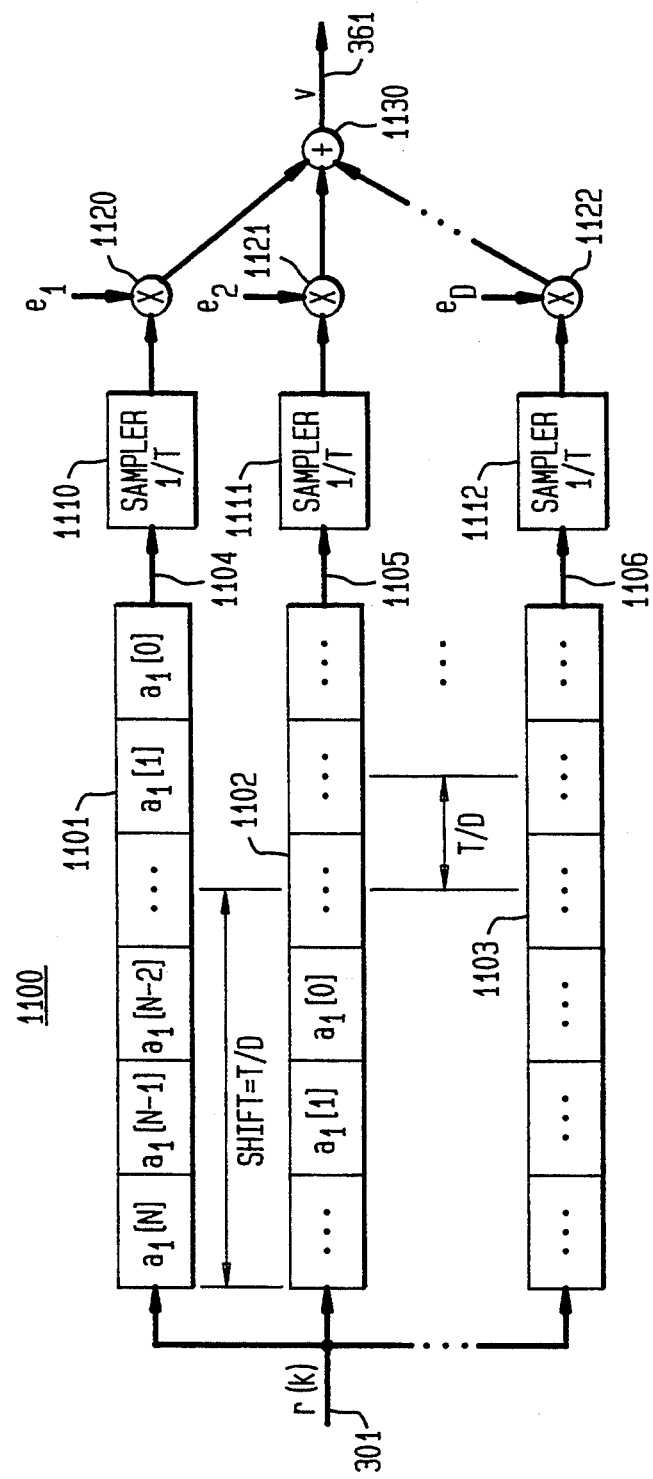
FIG. 11 illustrates one illustrative embodiment of a cyclically shifted filter bank for arbitrary D.

Filter configuration 1100 of FIG. 11 depicts an illustrative embodiment for the general cyclically shifted filter bank case. The structure and operation of filter 1100 is commensurate with the structure and operation previously described with reference to FIGS. 5 and 7. Thus, filter 1101 in the bank is the matched filter conventionally used to detect the CDMA signature. Filter 1102 is a cyclically shifted version of filter 1101; the shift, as measured in terms of delay time, is T/D. Another measure, as set forth in the foregoing discussion, is the integer part of N/D; this measure indicates a number by which the contiguous weights are successively shifted. For instance, with reference to FIG. 7, D=3 and N=6, so D divides N exactly yielding an integer part of 2. Accordingly, the contiguous weights are successively shifted by two positions to obtain the cyclically shifted filters. As an example, the $a_1[5]$ weight is shifted from the first position of filter 701 to the third position of filter 702, and finally to the fifth position of filter 703. At the same time, the other filter coefficients are moved in correspondence to the movement of the $a_1[5]$ coefficient. The set of adaptive coefficients, referred to as the $d_i$'s are again selected to minimize the mean square error between the transmitted symbol and detected symbol.

Figure 12:
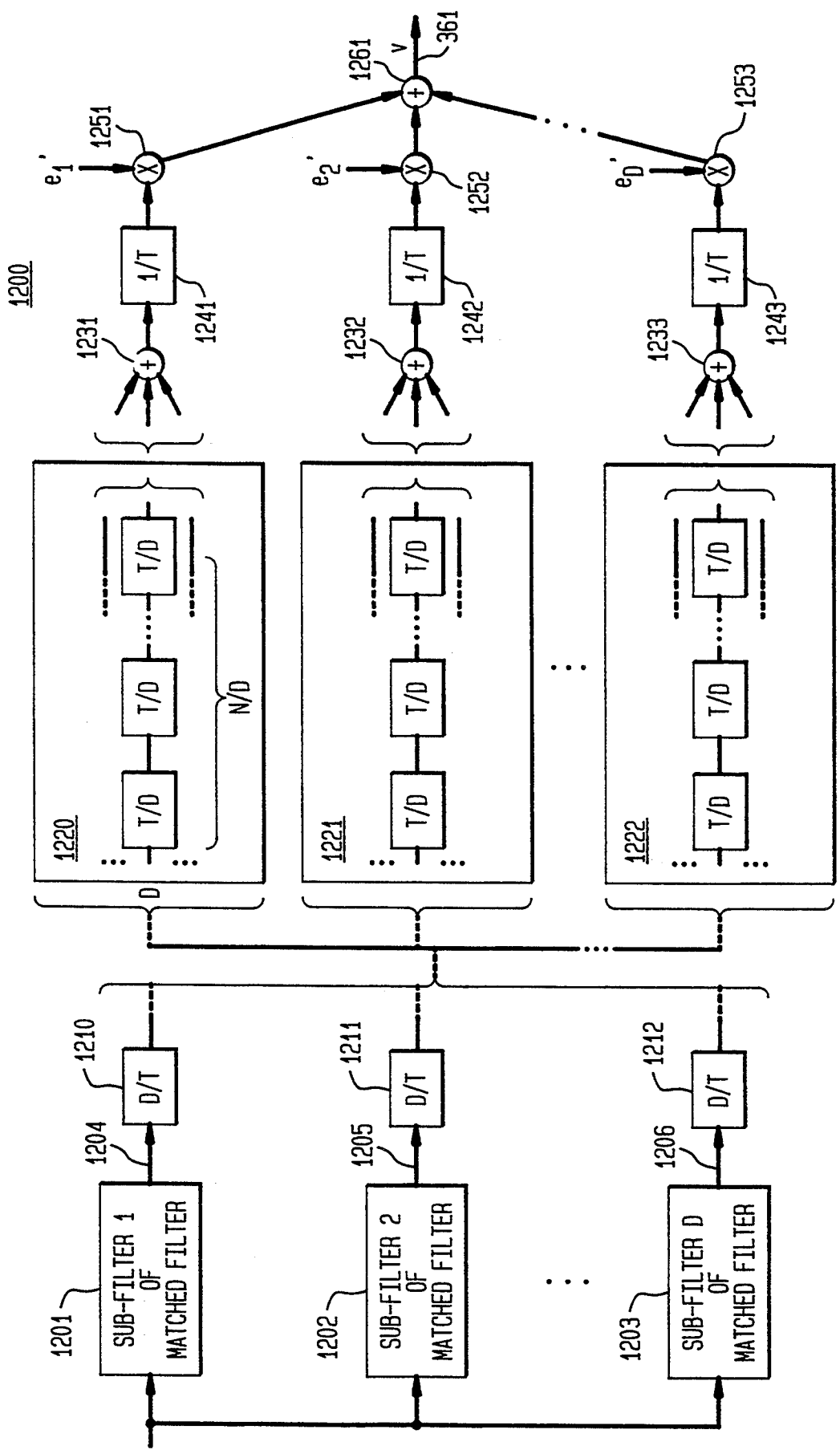
FIG. 12 illustrates one illustrative embodiment of a bank of sub-filters for arbitrary D corresponding to the short filter bank realization of the filter in FIG. 11.

Filter configuration 1200 of FIG. 12 depicts an illustrative embodiment for the bank of sub-filters case. The structure and operation of filter 1200 is commensurate with the structure and operation previously described with reference to the short filter bank realizations of FIGS. 6 and 8. Thus, sub-filters 1201-1203 in the bank are derived from the matched filter conventionally used to detect the CDMA signature by partitioning the matched filter into the sub-filters. A measure of the partitioning, as presented in the foregoing discussion, is the integer part of N/D. The matched filter is subdivided by grouping adjacent weights to form a set of contiguous weights, the set having a number of elements equal to N/D if D divides N exactly, or the (integer part of N/D)+1 if D does not divided N exactly. Then one sub-filter from the bank is assigned one of the groups of contiguous weights from the set of contiguous weights; another sub-filter is assigned another of the groups of contiguous weights from the set, and so forth. For instance, with reference to FIG. 8, N=6 and D=3, so D divides N exactly with N/D=2. Accordingly, the matched filter 401 is subdivided into pairs of contiguous filter weights, namely, the $a_1[5]$-$a_1[4]$ pair, the $a_1[3]$-$a_1[2]$ pair, and the $a_1[1]$-$a_1[0]$ pair. Each sub-filter 801, ..., or 803 is assigned one of the pairs, so the set of contiguous weights has three elements, each element given by the above-identified pairs.

The outputs of sub-filters 1201-1203, once sampled at the rate D/T by samplers 1210-1212, respectively, serve as inputs to tapped delay line arrangements 1220-1222, that is, each delay line arrangement 1220,.. ., or 1222 receives all outputs from sub-filters 1201-1203. With the focus on delay line arrangement 1220 initially, and as guided by FIG. 8, delay line arrangement 1220 is composed of a parallel arrangement of D delay lines each having, at most, (D−1) delay elements each providing a delay of T/D time units. The output of sub-filter 1203 undergoes the maximum delay by passing this output through the parallel branch having (D−1) delay elements. The output of sub-filter 1202 is passed through the parallel branch having (D=2) delays, until finally the output of sub-filter 1204 undergoes no delay in filter arrangement 1220. Delay line arrangement 1221 is also composed of a parallel arrangement of D delay lines each having, at most, (D−1) delay elements each providing a delay of T/D time units. The connection of delay line arrangement 1221 to the outputs of the samplers 1210-1212 is such that the delays to these outputs are a permutation of the delays provided by delay line arrangement 1220. Thus, for example, the output of sub-filter 1201 undergoes a single delay of T/D seconds, whereas the delay of sub-filter 1202 undergoes two delays of T/D seconds, until sub-filter 1203 undergoes no delay in filter arrangement 1221. Thus, the D delay line arrangements 1220-1222 provide all possible permutations of delays to the outputs of filters 1201-1203—thus the grouping of all delay line arrangements 1220-1222 may be referred to conveniently as a permuted delay line. The remainder of the circuitry in FIG. 1200, namely, summers 1231-1232, samplers 1241-1243, multipliers 1251-1253, and summer 1261, operate and are configured in a manner commensurate with FIGS. 6 and 8. The adaptive coefficients $e_i$'s are selected to minimize the mean square error between the transmitted symbol and detected symbol.

B. The Oversampling Scheme

The preceding receiver structure consisting of a bank of D cyclically shifted filters is similar (but not equivalent) to sampling the output of a single filter, matched to $f_0 = a_1$, D times per symbol period—call this the oversampling scheme. Consider detecting $b_1[0]$, and let $v[i]$ denote the filter output at chip time $N-1-i\Delta$, that is, $$v[i] = \sum_{l=0}^{N-1} a_1[l]\, r[l - i\Delta] \quad (10)$$

where $\Delta = [N/D]$ is now the interval between successive samples. The D-vector $v = (v[0], \ldots, v[D-1])^T$, and $\hat{b}_1[0] = \text{sgn}(c^T v)$, where $c \in R^D$ is chosen according to an MMSE criterion.

It is seen from equation (10) that the samples $r[n]$ needed to generate $v$ extend beyond the interval $0 \leq n \leq N-1$ corresponding to the bit $b_1[0]$. This means that, depending on the relative delay $\tau_j$, up to three bits of the jth interferer ($b_j[0]$, $b_j[-2]$) may interfere with a given bit of the desired transmission ($b_1[0]$). This is in contrast to the CSFB scheme, where at most two bits of the jth interferer ($b_j[0]$ and $b_j[-1]$) interfere with the desired bit. In addition, the adjacent bit of the desired transmission ($b_1[-1]$) causes self-interference, which does not occur in the CSFB scheme.

Figure 13:
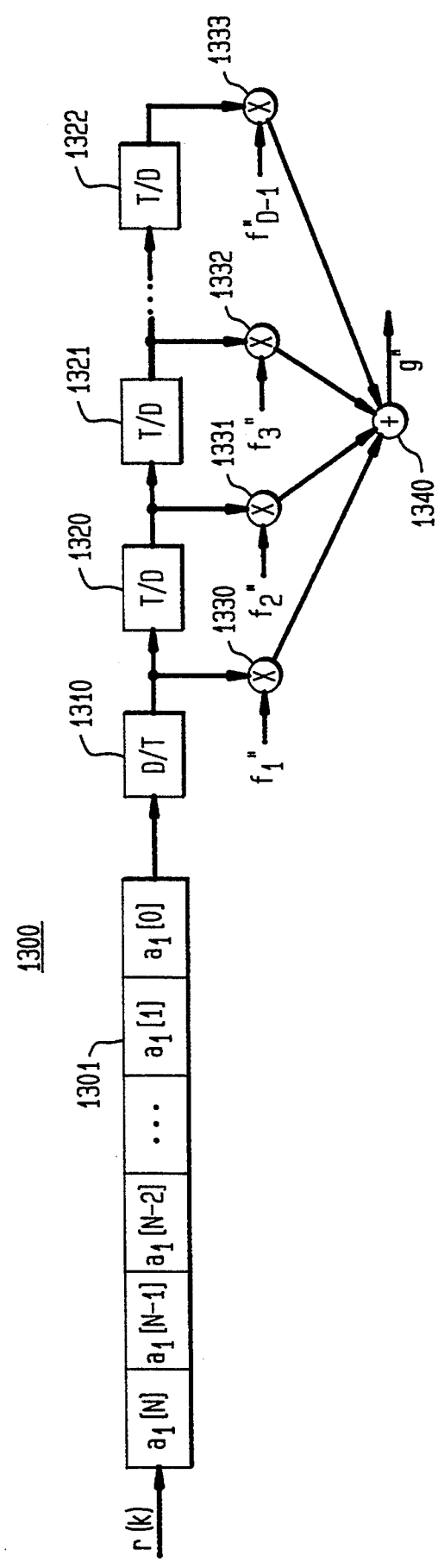
FIG. 13 illustrates one illustrative of a filter arrangement corresponding to the oversampling technique for arbitrary D.

Filter configuration 1300 of FIG. 13 depicts an illustrative embodiment for the general oversampling filter case. The structure and operation of filter 1300 are commensurate with the structure and operation previously described with reference to FIGS. 9 and 10. Thus, filter 1301 is the matched filter conventionally used to detect the CDMA signature. Sampler 1310 samples the outputs of filter 1301 at the rate D/T. The output of sampler 1310 serves as an input to delay elements 1320-1322, each providing a delay of T/D seconds. Outputs from each of the elements as well as sampler 1310 serve as inputs to multipliers 1330-1333, respectively. The adaptive coefficients, denoted as the f'''s, also serve as inputs to multipliers 1330-1333, respectively. Summer 1340, which receives the inputs of all multipliers, produces an estimate to the detected symbol.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

What is claimed is:

1. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the method comprising the steps of supplying the incoming sampled signal to a bank of at least two filters, each filter in the bank being selected as a cyclically shifted version of the matched filter used to detect the CDMA signature sequence assigned to the receiver, wherein the number of filters in the bank and each filter in the bank are configured with reference to a predetermined number of samples per symbol selected for processing, selecting the output of each filter in the bank at the symbol rate to produce a sampled output, weighting each sampled output by a coefficient from a set of coefficients selected to minimize the mean square error between the transmitted symbol and the detected symbol to produce a weighted sampled output, and summing each weighted sampled output to thereby generate the detected symbol.

2. The method as recited in claim 1 wherein the symbol rate is T, the processing gain is N, the chip rate is $T_c = T/N$, the predetermined number of samples per symbol is $D > 1$, one filter in the bank is the matched filter, another filter in the bank is the matched filter having the positions of its weights shifted by the integer part of N/D, and each successive filter in the bank, if any, is a shifted version of the prior shifted filter wherein the shift is in correspondence to the integer part.

3. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, and wherein the system has a pre-determined processing gain and a concomitant chip rate determined by the processing gain and the symbol rate of the system, the method comprising the steps of sampling the incoming channel signal at the chip rate to produce an incoming sampled signal, supplying the incoming sampled signal to a bank of at least two filters, each filter in the bank being selected as a cyclically shifted version of the matched filter used to detect the CDMA signature sequence assigned to the receiver, wherein the number of filters in the bank and each filter in the bank are configured with reference to a predetermined number of samples per symbol selected for processing, selecting the output of each filter in the bank at the symbol rate to produce a sampled output, weighting each sampled output by a coefficient from a set of coefficients selected to minimize the mean square error between the transmitted symbol and the detected symbol to produce a weighted sampled output, and summing each weighted sampled output to thereby generate the detected symbol.

4. The method as recited in claim 3 wherein the symbol rate is T, the processing gain is N, the chip rate is $T_c = T/N$, the predetermined number of samples per symbol is $D > 1$, one filter in the bank is the matched filter, another filter in the bank is the matched filter having the positions of its weights shifted by the integer part of N/D, and each successive filter in the bank, if any, is a shifted version of the prior shifted filter wherein the shift is in correspondence to the integer part.

5. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the method comprising the steps of supplying the incoming sampled signal to a bank of at least two sub-filters, each sub-filter in the bank being selected as a partitioned version of the matched filter used to detect the CDMA signature sequence of the receiver, wherein the number of filters in the bank and each sub-filter in the bank are configured with reference to a predetermined number of samples per symbol selected for processing, selecting the output of each sub-filter in the bank at an output rate commensurate with the number of filters in the bank to produce a sampled output for each sub-filter and a set of sampled outputs for the bank, supplying the set of sampled outputs to a set of tapped delay line arrangements, the number of delay line arrangements being equal to the number of sub-filters, for each delay line arrangement, selecting predetermined ones of the taps to produce an intermediary signal, sampling each intermediary signal at the symbol rate to obtain a sampled intermediary signal, weighting each sampled intermediary signal by a coefficient from a set of coefficients selected to minimize the mean square error between the transmitted symbol and the detected symbol to produce a weighted sampled output, and summing each weighted sampled output to thereby generate the detected symbol.

6. The method as recited in claim 5 wherein the symbol rate is T, the processing gain is N, the chip rate is $T_c = T/N$, the predetermined number of samples per symbol is $D > 1$, the matched filter weights are partitioned by grouping adjacent weights to form a set of groups of contiguous weights, the set having a number of elements equal to the integer part of N/D, plus one if D does not divide N exactly, and wherein one filter in the sub-bank is assigned one of the groups of contiguous weights from the set of contiguous weights, another filter in the sub-bank is assigned another of the groups of contiguous weights from the set of contiguous weights, and each successive sub-filter in the bank, if any, is assigned yet another of the groups of contiguous weights from the set of contiguous weights.

7. The method as recited in claim 6 wherein each successive delay line arrangement is a permutation of previously selected ones of the delay line arrangements.

8. The method as recited in claim 7 wherein the symbol rate is T, the processing gain is N, the chip rate is $T_c = T/N$, the predetermined number of samples per symbol is $D > 1$, the matched filter weights are partitioned by grouping adjacent weights to form a set of groups of contiguous weights, the set having a number of elements equal to the integer part of N/D, plus one if D does not divide N exactly, and wherein one filter in the sub-bank is assigned one of the groups of contiguous weights from the set of contiguous weights, another filter in the sub-bank is assigned another of the groups of contiguous weights from the set of contiguous weights, and each successive sub-filter in the bank, if any, is assigned yet another of the groups of contiguous weights from the set of contiguous weights.

9. The method as recited in claim 9, wherein each successive delay line arrangement is a permutation of previously selected ones of the delay line arrangements.

10. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, and wherein the system has a pre-determined processing gain and a concomitant chip rate determined by the processing gain and the symbol rate of the system, the method comprising the steps of
sampling the incoming channel signal at the chip rate to produce an incoming sampled signal,
supplying the incoming sampled signal to a bank of at least two sub-filters, each sub-filter in the bank being selected as a partitioned version of the matched filter used to detect the CDMA signature sequence of the receiver, wherein the number of filters in the bank and each sub-filter in the bank are configured with reference to a predetermined number of samples per symbol selected for processing,
selecting the output of each sub-filter in the bank at an output rate commensurate with the number of filters in the bank to produce a sampled output for each sub-filter and a set of sampled outputs for the bank,
supplying the set of sampled outputs to a set of tapped delay line arrangements, the number of delay line arrangements being equal to the number of sub-filters,
for each delay line arrangement, selecting predetermined ones of the taps to produce an intermediary signal,
sampling each intermediary signal at the symbol rate to obtain a sampled intermediary signal,
weighting each sampled intermediary signal by a coefficient from a set of coefficients selected to minimize the mean square error between the transmitted symbol and the detected symbol to produce a weighted sampled output, and
summing each weighted sampled output to thereby generate the detected symbol.

11. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the method comprising the steps of
supplying the incoming sampled signal to a matched filter used to detect the CDMA signature sequence of the receiver,
selecting the output of the matched filter at an output rate exceeding the symbol rate to produce a sampled output,
supplying the set of sampled output to a tapped delay line wherein the number of taps is selected with reference to the output rate,
weighting each output from a tap with a coefficient from a set of coefficients selected to minimize the mean square error between the transmitted symbol and the detected symbol to produce a weighted sampled output, and
summing each weighted sampled output to thereby generate the detected symbol.

12. A method for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, and wherein the system has a pre-determined processing gain and a concomitant chip rate determined by the processing gain and the symbol rate of the system, the method comprising the steps of
sampling the incoming channel signal at the chip rate to produce an incoming sampled signal,
supplying the incoming sampled signal to a matched filter used to detect the CDMA signature sequence of the receiver,
selecting the output of the matched filter at an output rate exceeding the symbol rate to produce a sampled output,
supplying the set of sampled output to a tapped delay line wherein the number of taps is selected with reference to the output rate,
weighting each output from a tap with a coefficient from a set of coefficients selected to minimize the mean square error between the transmitted symbol and the detected symbol to produce a weighted sampled output, and
summing each weighted sampled output to thereby generate the detected symbol.

13. Circuitry for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the circuitry comprising
a bank of at least two filters for receiving the incoming sampled signal, each filter in the bank being selected as a cyclically shifted version of the matched filter used to detect the CDMA signature sequence assigned to the receiver, wherein the number of filters in the bank and each filter in the bank are configured with reference to a predetermined number of samples per symbol selected for processing, means, responsive to the bank of filters, for selecting the output of each filter in the bank at the symbol rate to produce a sampled output, means, responsive to the means for selecting, for weighting each sampled output by a coefficient from a set of coefficients selected to minimize the mean square error between the transmitted symbol and the detected symbol to produce a weighted sampled output, and means, responsive to the means for weighting, for summing each weighted sampled output to thereby generate the detected symbol.

14. Circuitry for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the circuitry comprising a bank of at least two sub-filters for receiving the incoming sampled signal, each sub-filter in the bank being selected as a partitioned version of the matched filter used to detect the CDMA signature sequence of the receiver, wherein the number of filters in the bank and each sub-filter in the bank are configured with reference to a predetermined number of samples per symbol selected for processing, means, responsive to the bank, for selecting the output of each sub-filter in the bank at an output rate commensurate with the number of filters in the bank to produce a sampled output for each sub-filter and a set of sampled outputs for the bank, means, responsive to said means for selecting, for supplying the set of sampled outputs to a set of tapped delay line arrangements, the number of delay line arrangements being equal to the number of sub-filters, means, responsive to said means for supplying, for selecting for each delay line arrangement predetermined ones of the taps to produce an intermediary signal, means, responsive to said means for selecting, for sampling each intermediary signal at the symbol rate to obtain a sampled intermediary signal, means, responsive to said means for sampling, for weighting each sampled intermediary signal by a coefficient from a set of coefficients selected to minimize the mean square error between the transmitted symbol and the detected symbol to produce a weighted sampled output, and means, responsive to said means for weighting, for summing each weighted sampled output to thereby generate the detected symbol.

15. Circuitry for demodulating an incoming channel signal propagating in a DS/SS CDMA system with a receiver having a given CDMA signature sequence to generate a detected symbol which estimates a transmitted symbol, wherein the signature sequence is also assigned to a corresponding source, the source and receiver being synchronized, wherein the system has a pre-determined processing gain and a concomitant chip rate determined by the processing gain and the symbol rate of the system, and wherein the incoming channel signal is sampled at the chip rate to produce an incoming sampled signal, the circuitry comprising a filter matched to the CDMA signature sequence of the receiver for receiving the incoming sampled signal, means, responsive to said filter, for selecting the output of the matched filter at an output rate exceeding the symbol rate to produce a sampled output, means, responsive to said means for selecting, for supplying the set of sampled output to a tapped delay line wherein the number of taps is selected with reference to the output rate, means, responsive to said means for supplying, for weighting each output from a tap with a coefficient from a set of coefficients selected to minimize the mean square error between the transmitted symbol and the detected symbol to produce a weighted sampled output, and means, responsive to said means for weighting, for summing each weighted sampled output to thereby generate the detected symbol.

* * * * *

UNITED STATES PATENT AND TRADEMARK OFFICE
CERTIFICATE OF CORRECTION

PATENT NO. : 5,343,496

DATED : August 30, 1994

INVENTOR(S) : Michael L. Honig, Upamanyu Madhow

It is certified that error appears in the above-identified patent and that said Letters Patent is hereby corrected as shown below:

Column 19, line 4, after "recited in claim", delete 7 and insert -- 10 --.
Column 19, line 19, "claim 9" should read -- claim 8 --.

Signed and Sealed this

Second Day of March, 1999

Attest:

Q. TODD DICKINSON

*Attesting Officer*   *Acting Commissioner of Patents and Trademarks*